May 14, 1968 J. M. URITIS 3,383,067

TAPE REEL LATCH

Filed Dec. 30, 1966

Inventor:
JOSEPH M. URITIS
John V. Regan
Attorney

United States Patent Office 3,383,067

Patented May 14, 1968

3,383,067

TAPE REEL LATCH

Joseph M. Uritis, Haddonfield, N.J., assignor to Radio Corporation of America, a corporation of Delaware Filed Dec. 30, 1966, Ser. No. 606,226

3 Claims. (Cl. 242—68.3)

ABSTRACT OF THE DISCLOSURE

A reel latching hub having an elastic jacket surrounding a drum centrally positioned in a reel center opening and arranged to normally fill the space between the drum and the reel opening to hold the reel. A cam means is used to separate the reel from the latching device by stretching the rubber jacket.

This invention relates to tape transports. More specifically, the present invention relates to tape reel supporting hubs.

An object of the present invention is to provide an improved reel hub for supporting and fastening a tape reel thereon.

Another object of the present invention is to provide an improved tape reel support hub having a simple, rapid and effective reel-changing facility.

In accomplishing these and other objects, there has been provided, in accordance with the present invention, a tape reel support hub having a reel drive means positioned within and spaced from a center opening in a tape reel. An elastic jacket is arranged in an unstretched state to fill the space between the drive means and the inside surface of the reel opening. The unstretched jacket is provided with a pair of circumferential ridges for gripping the reel and the drive means, respectively. A jacket stretching means is arranged to stretch the jacket to release the reel from the drive means by concurrently reducing the size of the ridges and the thickness of the jacket.

Figures 1, 2, 3:
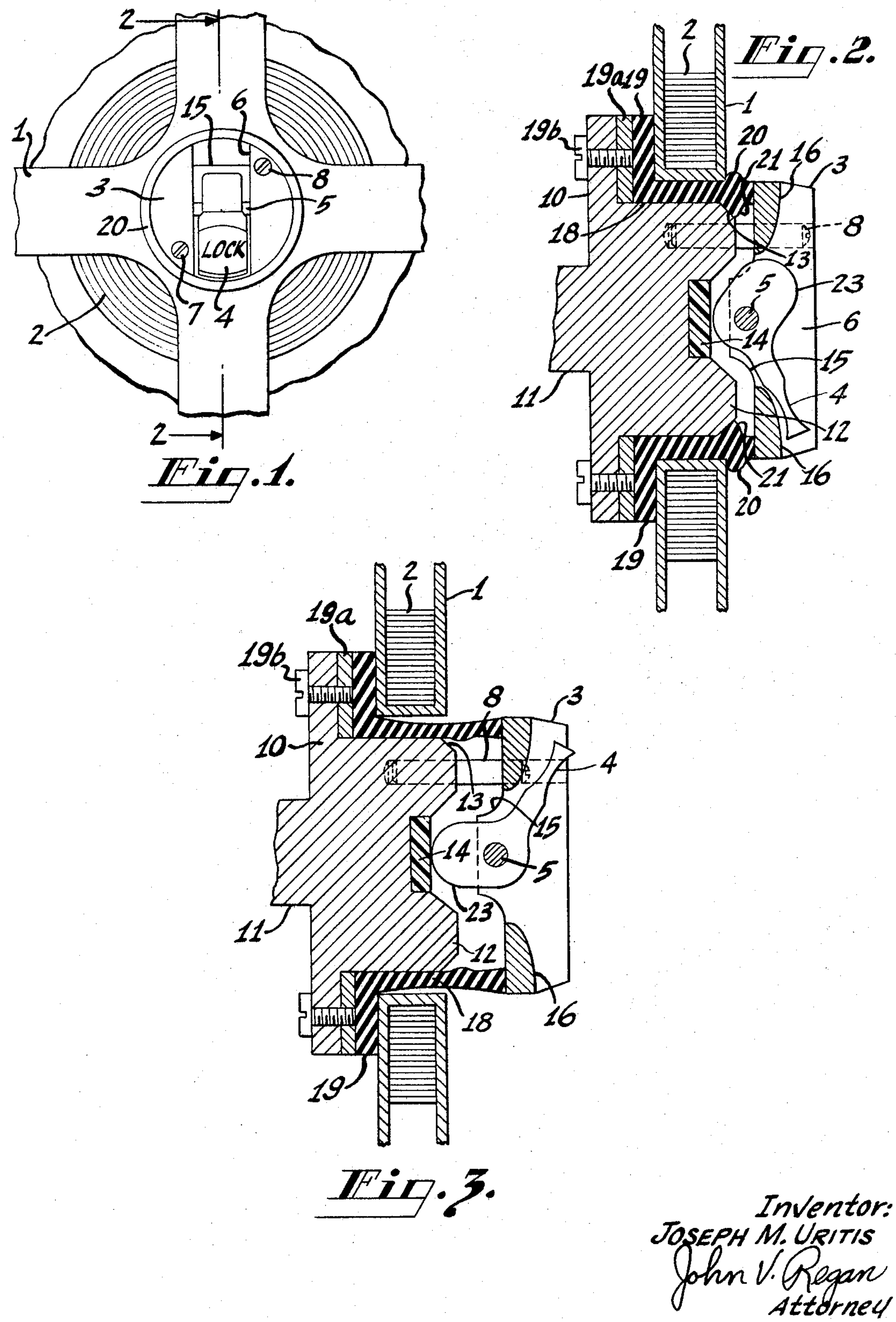
FIGURE 1 is a pictorial representation of a partial front view of the reel latch of the present invention.
FIGURE 2 is a cross-sectional side view taken along line 2—2 of the reel latch shown in FIGURE 1 in a "locked" position.
FIGURE 3 is a cross-sectional side view of the reel latch shown in FIGURE 1 in an "unlocked" position.

Referring to FIGURE 1 in more detail, there is shown a partial front view of a tape reel 1 having stored tape 2 thereon. In the center of the reel 1 is a standard size opening used to accommodate the reel hub 3 of the present invention. An operating lever, or tab 4 is shown in a "lock" position which is effective to secure the reel 1 on the hub 3 as explained more fully hereinafter. The tab 4 is pivoted on an axle 5 located within a slot 6 extending across the front face of the hub 3. The hub 3 is movably supported on a pair of guide pins 7, 8.

Referring now, also, to FIGURES 2 and 3, the internal structure and operation of the present invention may be clearly explained. The guide pins 7, 8, shown as representative pin 8 in FIGURES 2 and 3, extend between the hub 3 and a backing plate 10, or reel turntable. The plate 10 is arranged to be driven by any suitable motor means connected to a center drive shaft 11. A cylindrical drum 12 having a diameter substantially less than the diameter of the aforesaid opening in the reel 1 is axially aligned on the front surface of the plate 10. The height of the drum 12 is arranged to position its front surface ahead of the front surface of the reel 1 in the mounted position of the reel 1. A chamfered edge 13 is provided on the front edge of the drum 12.

The center of the drum 12 is recessed and arranged to support a pad of low-friction material 14 at the bottom of the recess. The slot 6 in the hub 3 is provided with a tapered bottom surface 16 which smoothly terminates in a center opening 15. The opening 15 is arranged to receive the end of the tab 4 mounted on the axle 5. A cylindrical jacket, or shell, 18 of elastic material, e.g., rubber, is arranged to surround the drum 12. An integral radial flange 19 is provided on the inner end of the jacket 18 between the plate 10 and the back face of the reel 1. The flange 19 is attached to the plate 10 by any suitable means. For example, a flat ring 19*a* may be bonded to the flange 19 and attached to the plate 10 by screws 19*b*.

The front edge of the jacket 18 is bonded to the underside of the hub 3 to form a smooth extension of the adjoining outside surface of the hub 3. An outside circumferential ridge 20 and a substantially similar inside ridge 21 are formed in the jacket 18 near the bonded front edge. In an unstretched state of the jacket 18, the outside ridge 20 is arranged to press against the front face of the reel 1 adjacent to the reel opening, while the inside ridge 21 is positioned in contact with the chamfer 13 of the drum 12. It is to be noted that the outer ridge 20 may be omitted if the clamping action of the inner ridge 21 is sufficient to retain the reel. This clamping action is effected by the wedging of the inner ridge 21 on the chamfer 13 to produce a bulging of the jacket 18 against the reel 1.

In operation, the present invention is arranged to fasten the reel 1 against the plate 10 to permit a rotational drive force to be applied to the reel 1. The elastic jacket 18 in its unstretched, or static state, is arranged to fill the space between the inner surface of the opening in the reel 1 and circumferential surface of the drum 18. Further, the outside ridge 20 is pressed against the reel 1 to secure the reel 1 against the flange 19 and plate 10. A similar clamping action is effected on the chamfer 13 of the drum 12 by the inner ridge 21.

The lever 4 may be either eccentrically mounted on the axle 5 or have a progressive surface on the journaled end or any combination of these. In any case, the journaled end of the lever 4 is arranged as a cam surface 23 to cooperate with the pad 14 when the lever 4 is selectively positioned in either a "lock" or an "open" position as shown in FIGURES 1 and 2, respectively. In the "lock" position of the lever 4, the cam surface 23 of the tab 4 is free of the cooperating surface of the pad 14 and the jacket 18 is in its static state as discussed above.

During a movement between the "lock" position and the "open" position, the tab 4 is flipped from one end of the slot 6 to the other. The cam surface 23 is progressively brought to bear on the pad 14 during this movement of the tab 4. This camming action is effective to separate the hub 3 from the drum 12 in the direction fixed by the guide pins 7, 8. Such a separation is operative to stretch the jacket 18 which is bonded to the hub 3. In the full "open" position of the tab 4, the cross-section of the jacket 18 is thinned by the aforesaid stretching action to withdraw the jacket 18 from the inner surface of the reel opening. Additionally, the ridges 20, 21 are reduced in size with the outer ridge 20 having a final outer diameter less than the diameter of the reel opening. It may be seen that in this position of the tab 4, the reel 1 may be removed from the reel hub of the present invention and a new reel positioned thereon. A subsequent flip of the lever 4 to the "lock" position is effective to return the jacket 18 and ridges 20, 21 to the reel securing state shown in FIGURE 2.

Thus, it may be seen that there has been provided, in accordance with the present invention, a reel hub for securely holding a reel on a tape transport while having a rapid reel-changing facility.

What is claimed is:

1. A reel latch comprising a reel drive means arranged to extend within a center opening in a reel and spaced peripherally therefrom, an elastic jacket attached at one end to said drive means and arranged to fill the space between said drive means and the inner surface of said opening in said reel in an unstretched condition to fasten said reel to said drive means and stretching means attached to said jacket at a free end thereof and operative to selectively stretch said jacket to unfasten said reel from said drive means, wherein said reel drive means includes a chamfered edge adjacent to said inner surface of said opening and said jacket includes an inner circumferential ridge arranged to cooperate with said chamfer in said unstretched state of said jacket to urge said jacket against said inner surface.

2. A reel latch as set forth in claim 1, wherein said jacket includes an outside circumferential ridge located on said jacket in an unstretched condition in an engaging relationship with a face of said reel adjacent to said opening.

3. A reel latch as set forth in claim 1, wherein said drive means includes a reel support drum positioned within said center opening and having a diameter substantially less than the diameter of said opening and said stretching means attached to said jacket includes a cam member rotatably mounted on said drum and operable between a first position and a second position, said cam member being arranged to cooperate with said drum to space said stretching means attached to said jacket from said drum when said cam member is in said first position whereby to stretch said jacket.

References Cited

UNITED STATES PATENTS

| | | | |
|---|---|---|---|
| 2,563,994 | 8/1951 | Dougherty | 242—72 X |
| 3,000,582 | 9/1961 | Brede | 242—68.3 X |
| 3,250,485 | 5/1966 | Fugit | 242—68.3 |

FRANK J. COHEN, *Primary Examiner.*

N. L. MINTZ, *Assistant Examiner.*